United States Patent [19]

Horike et al.

[11] 4,173,402

[45] Nov. 6, 1979

[54] OPTOELECTRONIC SENSING APPARATUS

[75] Inventors: Masanori Horike; Isamu Shibata; Ikuo Maeda, all of Tokyo, Japan

[73] Assignee: Ricoh Company, Ltd., Tokyo, Japan

[21] Appl. No.: 883,838

[22] Filed: Mar. 6, 1978

[30] Foreign Application Priority Data

Mar. 10, 1977 [JP] Japan ................... 52-26386

[51] Int. Cl.$^2$ .................. G03B 13/20; G01C 3/08
[52] U.S. Cl. ..................... 354/25; 354/198; 250/204; 250/221; 340/38 P; 340/44; 356/4
[58] Field of Search .............. 354/25, 198, 162, 163; 352/140; 250/201, 204, 221; 235/98 C; 340/31 A, 37, 38 P, 44; 49/31; 187/52 R; 356/4

[56] References Cited

U.S. PATENT DOCUMENTS

| | | | |
|---|---|---|---|
| 2,037,190 | 4/1936 | Backer | 250/221 |
| 3,613,074 | 10/1971 | Hill et al. | 340/37 |
| 3,764,813 | 10/1973 | Clement et al. | 250/221 |
| 3,816,745 | 6/1974 | Primm et al. | 250/221 |
| 3,863,206 | 1/1975 | Rabie | 340/37 X |
| 3,896,304 | 7/1975 | Aoki et al. | 250/201 |
| 4,047,187 | 9/1977 | Mashimo et al. | 354/25 X |
| 4,080,531 | 3/1978 | Stauffer | 354/25 X |

*Primary Examiner*—L. T. Hix
*Assistant Examiner*—William B. Perkey
*Attorney, Agent, or Firm*—David G. Alexander

[57] ABSTRACT

First and second optical systems each comprise identical converging lenses which focus light images of an object onto identical photosensor arrays, the lenses being parallel. First and second mirrors reflect the light images from the respective lenses onto the respective arrays. The first mirror is fixed whereas the second mirror is rotatable. Where the second mirror is rotated to a position where the light images on the arrays are identical, the distance to the object is a function of the position of the second mirror which is predetermined by triangulation. As the second mirror is rotated through a predetermined range the arrays are strobed a predetermined number of times to produce analog signals having magnitudes corresponding to incident light. The respective analog signals are subtracted and the resulting difference signals compared with a previously minimum value. Each time the arrays are strobed a counter is incremented. However, when a difference signal has a value lower than the minimum value (a previous difference signal), it becomes the new minimum value and the counter is reset. The count in the counter after the arrays are strobed the predetermined number of times corresponds to the position of the second mirror when the minimum value was sensed and thereby the distance to the object. A servo system may be provided to position a camera lens in accordance with the count in the counter and thereby automatically focus a camera.

10 Claims, 9 Drawing Figures

OPTOELECTRONIC SENSING APPARATUS

BACKGROUND OF THE INVENTION

The present invention relates to an optoelectronic sensing apparatus which may be used to automatically focus a camera.

Rangefinders are well known in the art of photography and the like which comprise parallel objective lenses which are spaced transversely apart from each other by the greatest practical distance. An eyepiece lens receives an image of an object from one of the objective lenses either directly or after reflection by fixed mirrors or prisms. The eyepiece lens also receives a light image of the object from the other objective lens, but after reflection by a rotatable mirror. The rangefinder is constructed so that the images from the two objective lenses coincide at one position of the rotatable mirror. Since the distance between the objective lenses and the angle of the rotatable mirror are known, the distance to the object may be calculated by simple triangulation.

In a practical rangefinder of this type, a knob is provided by which the operator may rotate the rotatable mirror, and in addition with a scale graduated in feet, meters or the like which is mechanically linked to the mirror. Thus, the operator may merely turn the knob until the two images coincide and read the distance to the object on the scale.

Where such a rangefinder is provided as an integral part of a camera, the knob is constituted by the camera focussing ring. Since the rangefinder and focussing ring are mechanically linked together and calibrated, the photographer may focus the camera by merely turning the focussing ring until the images in the rangefinder coincide, without having to know the actual distance to the object which he wishes to photograph. A variation of this type of rangefinder is the split image rangefinder in which the images from the respective objective lenses constitute adjacent vertical segments of the field of view in front of the rangefinder, with one of the segments being transversely shifted relative to the other upon rotation of the mirror.

As a natural consequence of the introduction of new electronic technology and the minaturization of electronic components, automatic systems are being developed for cameras which relieve the photographer of the troublesome tasks of setting the shutter speed, lens opening and focus. Automatic cameras are desirable for amateur photographers who do not wish to study photography in sufficient depth to learn how to manipulate the various adjustments of a camera, but still want to enjoy the advantages of good image quality and exposure. These cameras are also desirable for advanced amateur and professional photographers since they relieve them of the mundane tasks of camera operation and free them to concentrate entirely on their subject matter and composition.

Automatic exposure systems have been developed which are not the subject matter of the present invention. Rather, this invention relates to automatic focussing by means of optoelectronic sensing.

It has been proposed heretofore to provide, in the type of rangefinder described above, two identical photosensor arrays which receive the images from the first and second objective lenses. The arrays produce identical outputs at the position of the rotatable mirror at which the light images incident on the arrays are identical.

The distance to an object may be determined by rotating the mirror and sensing the position thereof at which the difference between the outputs of the arrays is minimum. The position of the mirror corresponds to the distance to the object as with the optical rangefinder. A servo system may be provided to drive a camera lens to a position corresponding to the mirror position, thereby automatically focussing the camera.

In such an optoelectronic rangefinder, two methods have heretofore been used to determine the mirror position producing the minimum difference between the outputs of the arrays. In both methods, the mirror is rotated throughout a predetermined maximum range and the outputs of the arrays compared at a number of positions of the mirror during rotation thereof, the output signals of the arrays being subtracted to produce difference signals.

In the first method the difference signals are compared with a predetermined minimum value, and the mirror position at which the difference signals first drop below the minimum value is taken as corresponding to the distance to the object. Depending on the type of scene being photographed, the difference signals following the one determined to correspond to the distance to the object may drop even further below the minimum value. The result is erroneous determination of distance and an out-of-focus picture.

The second method involves sensing the position of the mirror at which the magnitude of a difference signal is greater than the magnitude of a preceeding difference signal. Theoretically, this indicates that the minimum difference signal has been sensed and that the distance to the object has been correctly determined.

However, in photography of certain scenes such as those of trees or buildings having vertical striped patterns, the curve corresponding to the values of the difference signals has a number of inflection points. In the second method of distance determination the distance will be determined as corresponding to the first concave inflection point, even if the actual distance produces a subsequent difference signal having a lower magnitude. One skilled in the art will readily appreciate how this method can produce a determined distance which varies from the actual distance by a great extent.

Prior art optoelectronic rangefinders of the type described above may comprise analog integrators made up of operational amplifiers and other components. In order to improve the accuracy of the apparatus, the arrays each comprise a plurality of photosensor elements which are sequentially strobed a number of times during rotation of the mirror. The outputs of respective elements are applied to a differential amplifier which produces the difference signals. An analog integrator integrates the difference signals from all of the elements each time the arrays are strobed to produce a summation signal. The summation signal is compared with a predetermined minimum value or the preceeding summation signal for distance determination.

Analog integrators of this type comprise capacitors which are charged by the difference signals to an extent corresponding to the integrals of the difference signals with respect to time, in summation. After the summation process is completed at one position of the mirror, the capacitor must be completely discharged in preparation for the next summing operation.

The time constant requirements of the capacitor for integration and substantially instantaneous discharge are mutually conflicting, generally limiting the speed of operation of the circuitry. In addition, the capacitor and other elements of the circuitry are subject to wide variations in the effective values thereof caused by temperature, humidity, ageing, etc., causing inaccurate operation of the apparatus. The accuracy of the apparatus is also limited by the analog integrating components which are inherently less accurate than digital components.

SUMMARY OF THE INVENTION

The present invention overcomes the drawbacks of the prior art by providing an improved method of distance determination and novel digital circuitry which greatly increase the accuracy and reliability over the prior art. The difference signals described hereinabove are summed by digital, rather than analog circuitry. Furthermore, the summation signals are sensed at all positions of the mirror, and the mirror position producing the lowest summation signal is determined to correspond to the distance to the object.

It is an object of the present invention to provide an optoelectronic sensing apparatus which may be advantageously used to automatically focus a camera.

It is another object of the present invention to provide an optoelectronic sensing apparatus of greatly improved accuracy over the prior art.

It is another object of the present invention to provide an optoelectronic sensing apparatus of greatly improved reliability of distance measurement over the prior art.

It is another object of the present invention to provide an optoelectronic sensing apparatus which may be advantageously manufactured at low cost using standardized electronic components on a commercial production basis.

It is another object of the present invention to provide a generally improved optoelectronic sensing apparatus.

Other objects, together with the foregoing, are attained in the embodiments described in the following description and illustrated in the accompanying drawing.

BRIEF DESCRIPTION OF THE DRAWING

FIGS. 5, 5A, 5B show an electrical block diagram of an optoelectronic sensing apparatus embodying the present invention.

DESCRIPTION OF THE PREFERRED EMBODIMENTS

While the optoelectronic sensing apparatus of the invention is susceptible of numerous physical embodiments depending upon the environment and requirements of use, substantial numbers of the herein shown and described embodiments have been made, tested and used, and all have performed in an eminently satisfactory manner.

Figures 1, 2, 3, 4:
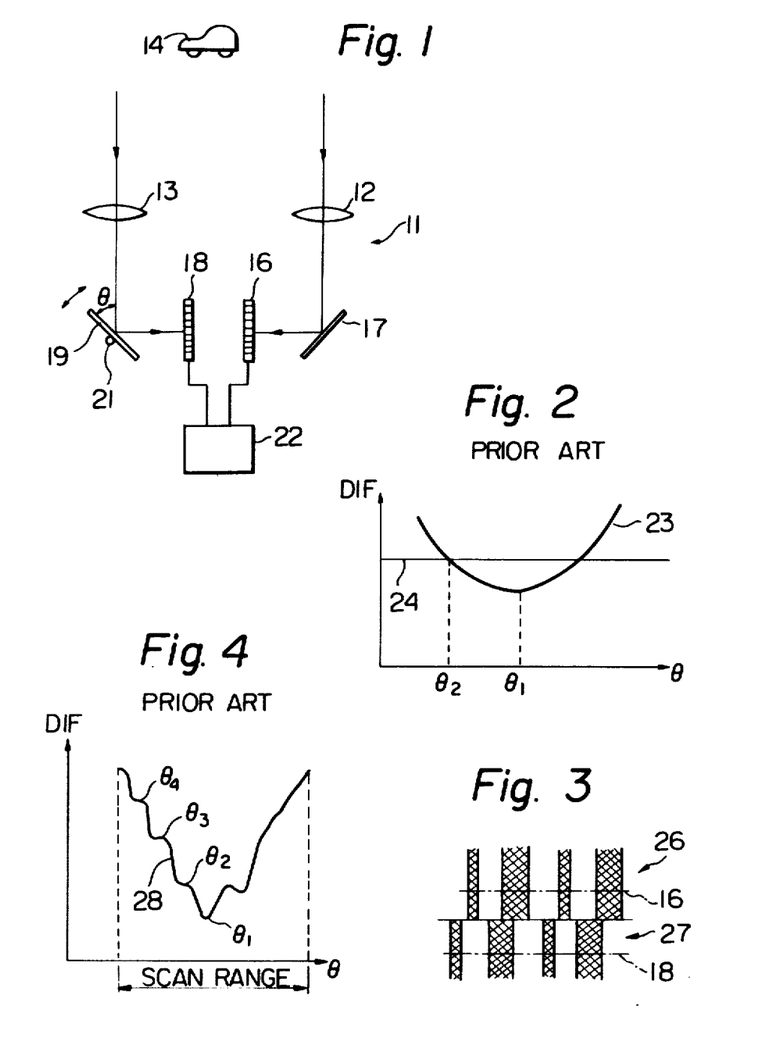
FIG. 1 is a schematic view of an apparatus illustrating the basic principle of the present invention.
FIG. 2 is a graph illustrating a first prior method of distance determination using the apparatus of FIG. 1.
FIG. 3 is a schematic view of images of a vertically striped pattern.
FIG. 4 is a graph illustrating how an incorrect distance measurement will result when the apparatus of FIG. 1 is utilized to determine the distance to an object having the pattern of FIG. 3 utilizing a second prior art method of distance determination.

Referring now to FIG. 1 of the drawing, an optoelectronic sensing apparatus 11 comprises converging lenses 12 and 13 respectively which are identical and parallel to each other. The lenses 12 and 13 are transversely spaced apart by the greatest practical distance. The lens 12 focusses a light image of an object 14 such as an automobile onto a photosensor array 16. A fixed mirror 17 is provided in the optical path of the image between the lens 12 and array 16. The lens 13 focusses an image of the object 14 onto a photosensor array 18 which is identical to the array 16. A rotatable mirror 19 is provided to reflect the image from the lens 13 onto the array 18. The mirror 19 is mounted on a rotary shaft 21.

Each of the photosensor arrays 16 and 18 comprise the same number of photosensor elements arranged in a row, the elements being shown but not designated for simplicity of illustration. The photosensor elements may be charge coupled devices (CCD). The respective photosensor elements of the arrays 16 and 18 are scanned or strobed in sequence to produce analog signals having magnitudes corresponding to incident light intensity. These signals are fed to a computing circuit 22.

A suitable drive means rotates the mirror 19 throughout a maximum predetermined range and the computing means 22 senses the outputs of the arrays 16 and 18. When the mirror 19 is moved to such a position that the images incident on the arrays 16 and 18 are identical, the arrays 16 and 18 will produce identical output signals. The mirror position at which this occurs is sensed by the computing means 22.

The computing means 22 computes the distance from the apparatus 11 to the object 14 as a function of the distance between the lenses 12 and 13 and the angular position $\theta$ of the mirror 19. A simple trigonometric triangulation function may be employed to compute the distance given the focal lengths of the lenses 12 and 13, etc.

FIG. 2 illustrates the first prior art method of distance determination described hereinabove. The output signals of the arrays 16 and 18 are summed and subtracted to produce a difference signal 23 which is compared with a predetermined minimum value 24. The abscissa axis represents the mirror position $\theta$ and the ordinate axis represents the difference signal. It will be seen from the curve 23 that the images coincide (the difference signal is minimum) at a position $\theta 1$. However, the first position at which the curve 23 crosses the minimum value line 24 is at $\theta 2$, differing substantially from the position $\theta 1$. This will cause an error in distance determination equal to $\theta 1 - \theta 2$.

FIG. 3 illustrates two images 26 and 27 produced by the lenses 12 and 13 respectively in schematic form. The images 26 and 27 are focussed on the arrays 16 and 18 respectively as indicated symbolically by broken lines. As illustrated, the mirror 19 is not positioned so that the images 26 and 27 are identical as incident on the arrays 16 and 18. In other words, the position $\theta$ of the mirror 19 does not correspond to the distance to the object 14.

It will further be noted that the images 26 and 27 are constituted by a vertical stripe pattern and are identical except for their horizontal position.

FIG. 4 illustrates how the second prior art method of distance determination will produce an error when applied to a pattern such as in FIG. 3. Here, the difference signals trace a curve 28 which has a minimum value $\theta 1$. This minimum value $\theta 1$ corresponds to the correct distance to the object 14. However, it will be further noted that the curve 28 has concave inflection points at $\theta 2$, $\theta 3$ and $\theta 4$. Where the distance is determined to correspond to the first concave inflection point $\theta 4$, the result will be a large error equal to $\theta 1 - \theta 4$.

Figure 5A:
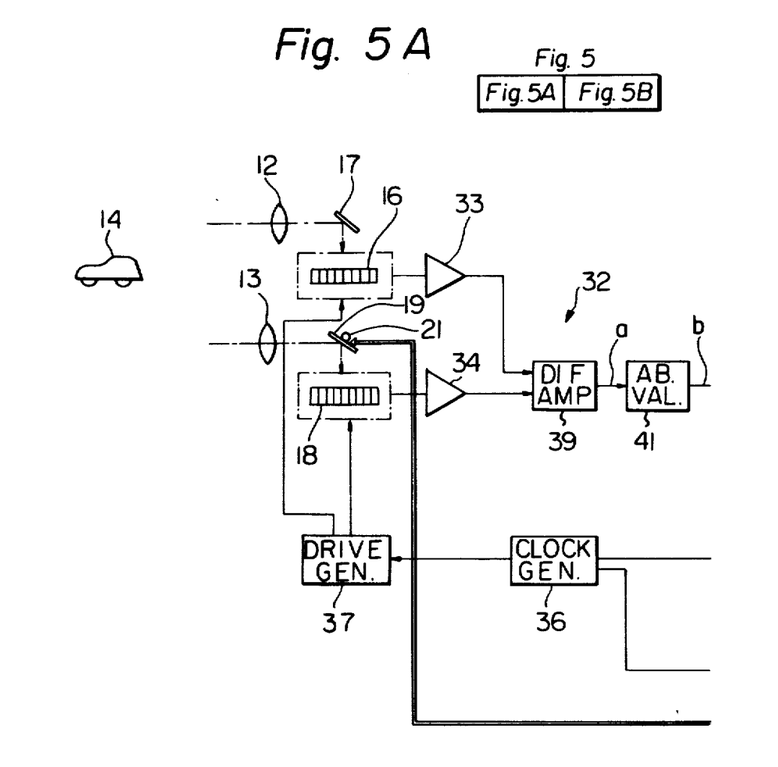

These drawbacks are completely overcome in an optoelectronic sensing apparatus 31 embodying the present invention which is shown in FIG. 5. The apparatus 31 comprises a computing circuit 32 having buffer amplifiers 33 and 34 connected to the outputs of the arrays 16 and 18 respectively. A clock pulse generator 36 feeds clock pulses to a drive pulse generator 37 which generates drive or strobe pulses. The strobe pulses are fed to the arrays 16 and 18. Upon application of a first strobe pulse, the first photosensor elements in the arrays 16 and 18 are enabled and produce analog electrical signals having magnitudes corresponding to incident light intensity. Upon application of the next strobe pulse, the next adjacent photosensor elements of the arrays 16 and 18 are enabled and produce output signals. The apparatus 31 is arranged so that all of the photosensor elements of the arrays 16 and 18 are strobed in sequence in such a manner that respective elements thereof produce output signals simultaneously.

Figure 6:
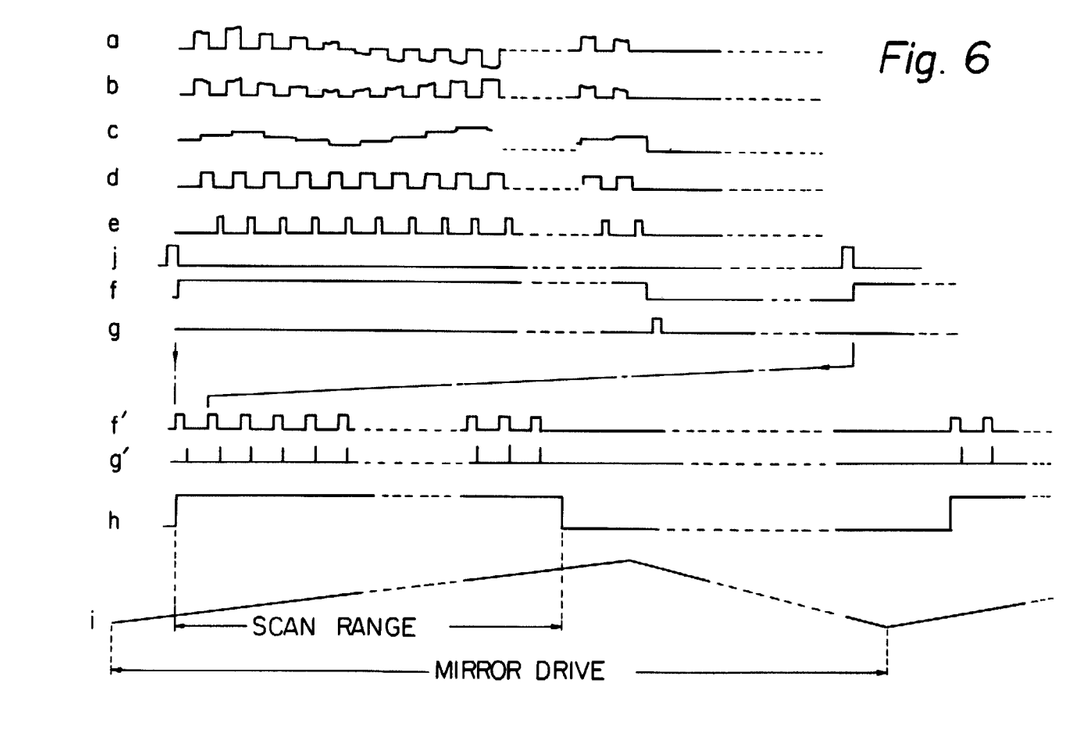
FIG. 6 is a timing diagram of the apparatus of FIG. 5.

The clock pulses from the clock pulse generator 36 are also fed to a mirror drive unit 38 which rotates the mirror 19 via the shaft 21 throughout a predetermined range in response thereto. Indicated at i in FIG. 6 is a linear ramp signal generated within the drive unit 38 for driving the mirror 19. Although not shown, the drive unit 38 comprises a servo means for positioning the mirror 19 in such a manner that $\theta$ is proportional to the magnitude of the signal i.

Indicated at h in FIG. 6 is a pulse signal generated by a monostable multivibrator or the like (not shown) constituting part of the drive pulse generator 37. The pulse h determines the scan range of the mirror 19 which is actually used for distance sensing. It will be seen that the scan range is constituted by part of the rising portion of the ramp signal i during which time the mirror 19 is rotated in one direction. The retrace time, or the time during which the mirror 19 is returned to its initial position, does not constitute part of the sensing period.

The drive pulse generator 37 is designed to strobe the arrays 16 and 18, by means of example, 60 to 100 times during each scan period. In other words, the photosensor elements of the arrays 16 and 18 are sequentially strobed 60 to 100 times during each scan period, dividing the displacement of the mirror 19 during the scan period into 60 to 100 increments.

The output signals of the buffer amplifiers 33 and 34 are applied to inputs of a differential amplifier 39 which produces analog difference signals corresponding to the differences between the respective input signals. The output of the differential amplifier 39 is indicated at a in FIG. 6, and is constituted by a plurality of discrete pulses corresponding to the outputs of the respective photosensor elements.

The output of the differential amplifier 39 is applied to an absolute value unit 41 which generates at its output a positive signal indicated at b in FIG. 6 which has a magnitude equal to the absolute value (magnitude) of the signal a. However, it will be noted that the signal b also consists of pulses which are separated in time. This is due to the intervals between the strobe pulses applied to the arrays 16 and 18.

The curve b is made continuous by an analog sample and hold unit 42 which produces at its output a signal c shown in FIG. 6. The unit 42 samples the signal b at the leading edge of each pulse and holds or latches the signal level until occurance of the leading edge of the next pulse. The output of the sample and hold unit 42 is applied to the input of an analog-to-digital converter 43 which produces, for example, an 8-bit parallel output signal having a value corresponding to the magnitude of the signal c in response to the leading edges of timing pulses d drom a timing pulse generator 44. The generator 44 is driven by clock pulses from the clock pulse generator 36. Thus, the converter 43 produces 8-bit binary codes corresponding to the magnitudes of the difference signals produced by strobing individual respective photosensor elements of the arrays 16 and 18.

The output of the converter 43 is applied to a binary adder 46 which is initially cleared by a pulse indicated at j in FIG. 6. The output of the adder 46 is applied to a buffer register 47 which is also initially cleared or reset by the signal j. The output of the buffer register 47 is connected to an input of the adder 46 in such a manner that the adder 46 adds the outputs of the converter 43 and buffer register 47.

The converter 43 is adapted to perform conversion in response to pulses d from the timing pulse generator 44 which correspond to the strobe pulses applied to the arrays 16 and 18.

In response to the leading edge of a pulse e shown in FIG. 6, generated by the timing pulse generator 44, the adder 46 adds the output of the converter 43 to the output of the buffer register 47 and stores the sum in the buffer register 47. It will be noted that the pulses e are generated at the trailing edges of the pulses d. When the output of the converter 43 corresponds to the output signals of the first photosensor elements, the contents of the buffer register 47 will be zero. For subsequent addition operation, the accumulated sum in the buffer register 47 is added to the new output of the converter 43 and the new accumulated sum stored in the buffer register 47. The adder 46 in combination with the buffer register 47 functions as a summing circuit to sum the digital difference signals produced by strobing all of the photosensor elements of the arrays 16 and 18 once.

A register 48 is adapted to store the summation signal accumulated in the buffer register 47 having the minimum value. At the end of the pulse f generated in the timing pulse generator 44, the generator 44 feeds a pulse g to a comparator 49 having inputs connected to the outputs of the registers 47 and 48. It will be noted that a pulse g is produced after all of the photosensor elements have been strobed and the corresponding difference signals accumulated in the register 47. Further illustrated in FIG. 6 are signals f' and g' which constitute a continuation of the signals f and g compressed in time.

The output of the comparator 49 is fed to a control input of the register 48 in such a manner that the output of the register 47 destructively replaces the contents of the register 48 when the value of the contents of the register 47 is lower than the contents of the register 48. The contents of the registers 47 and 48 are designated as B and A respectively. Thus, when B<A, B is stored in the register 47.

This circuitry serves to compare the current summation signal with the previously minimum summation signal. Where the arrays 16 and 18 are strobed for the first time, A=O and B will always be set into the register 48. If the next summation signal is lower in value than the first one, it will be set into the register 48. In the next summation signal is larger than the first one, the contents of the register 48 will not be changed.

In this manner, the lowest summation signal is sensed and stored in the register 48. In accordance with the present invention, all of the 60 to 100 summation signals produced during the scan range of the mirror 19 are sensed to determine the signal with the minimum value.

The signal g is also fed to the up-count input of a pulse counter 51 which has a reset input connected to the output of the comparator 49. In response to each pulse g when B>A, the counter 51 is incremented. However, if B<A, the counter 51 is reset to zero. In other words, the counter 51 is incremented each time the arrays 16 and 18 are strobed, except when the summation signal produced is lower in value than the previous minimum value summation signal. In the latter case, the counter 51 is reset.

The counter 51 will be reset for the last time in response to the summation signal having the lower value of all 60 to 100 summation signals. Thus, the count in the counter 51 at the end of the scan range corresponds to the position of the mirror 19 at which the minimum value was sensed. Where the scan range consists of 100 increments (the arrays 16 and 18 are strobed 100 times) and the count in the counter 51 at the end of the scan range is 69, the minimum value summation signal was produced at the 31st increment. In other words, the count in the counter 51 equals the distance from the minimum value to the end of the scan rage.

In summary, it will be understood that the minimum value summation signal is sensed and stored in the register 48 and the count in the counter 51 corresponds to the mirror position at which the minimum value was sensed. The count in the counter 51 thereby corresponds to the correct distance from the apparatus 11 to the object 14.

Figure 5B:
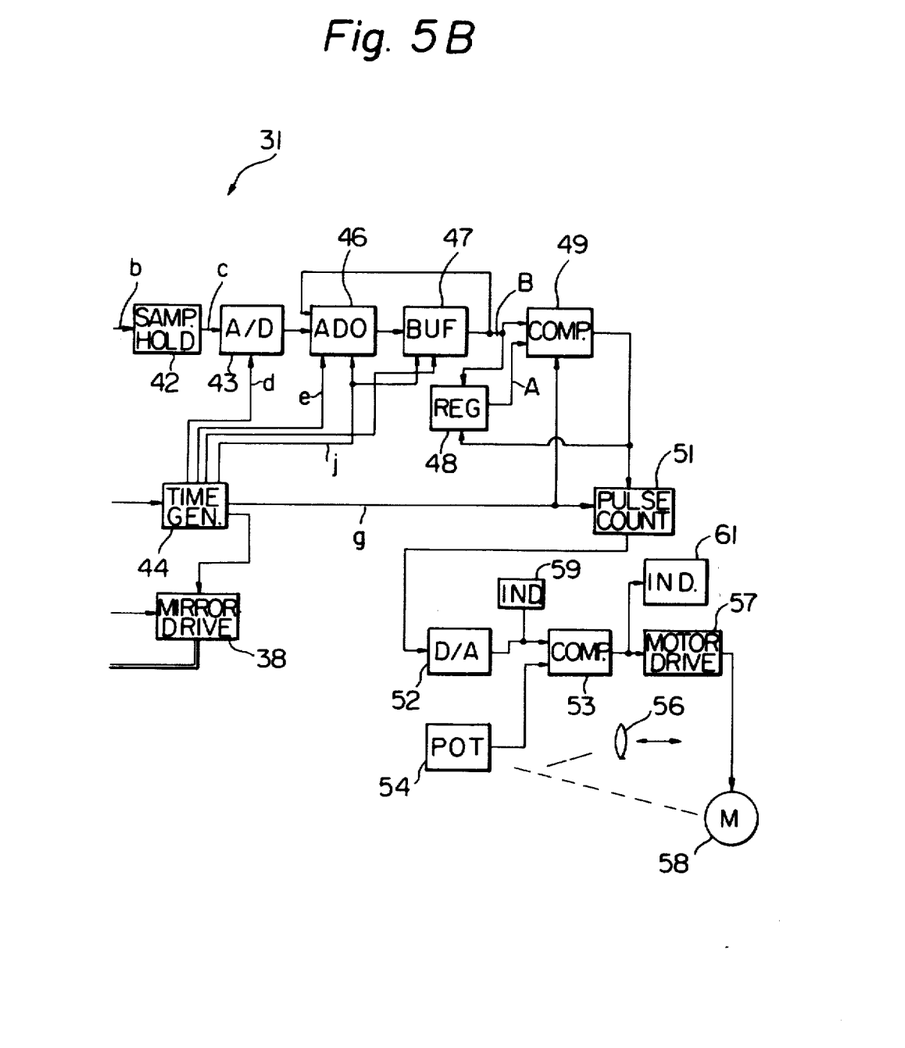

The output of the counter 51 is converted into an analog signal by a digital-to-analog converter 52 and applied to a comparator 53. A potentiometer 54 is mechanically linked to a camera lens 56 and produces an analog position signal having a magnitude corresponding to the axial position of the camera lens 56. The comparator 56 produces an error signal corresponding to the difference between the command signal (output of the converter 52) and the position signal and feeds the same to a motor drive unit 57 for driving a motor 58. The motor 58 is connected to axially move the lens 56 in accordance with the polarity and magnitude of the error signal and moves the camera lens 56 to a position where the error signal is reduced to zero. These elements constitute a closed loop servo system for focussing a camera (not shown) in which the lens 56 is incorporated. The output of the converter 52 indicates the distance to the object 14. The output of the potentiometer 54 indicates the position of the camera lens 56. The motor 58 is driven until the position of the camera lens 56 corresponds to the distance to the object 14.

Further illustrated are indicators 59 and 61 connected to the outputs of the converter 52 and comparator 53 respectively. The indicator 59 indicates when the correct distance has been sensed and signals to the photographer not to press the shutter release during the sensing operation. The indicator 61 indicates that the camera has been properly focussed. The indicator 61 allows the camera to be focussed in a semi-automatic manner if desired.

Figure 7:
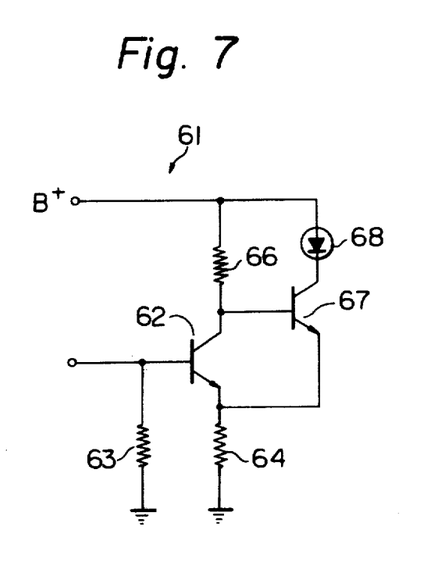
FIG. 7 shows an exemplary embodiment of the indicator 61 of FIG. 5B.

FIG. 7 illustrates an examplary embodiment of the indicator 61 as comprising an NPN transistor 62, the base of which is connected to the output of the comparator 53. An input resistor 63 is connected between the base of the transistor 62 and ground. The emitter of the transistor 62 is grounded through a resistor 64. The collector of the transistor 62 is connected to a positive voltage source B+ through an output resistor 66.

The collector of the transistor 62 is connected to the base of an NPN transistor 67, the emitter of which is connected to the emitter of the transistor 62. The collector of the transistor 67 is connected to the cathode of a light emitting diode (LED) 68, the anode of which is connected to the power source B+.

When the error signal is reduced to zero, the transistor 62 is turned off and the collector voltage thereof approaches B+. This turns on the transistor 67 which passes current through LED 68 to light the same.

Although the present apparatus 31 has been illustrated and described as being adapted to automatically focus a camera, the invention is not so limited. The computing circuit 32 may be incorporated into an apparatus which comprises only one photosensor array receiving a changing light image from a fixed optical converging means. In this case, the computing circuit 32 compares the output of the array with a reference signal stored in a register or the like and produces an output when a summation signal having a predetermined minimum value is sensed. Such an apparatus may be used for automatic control of elevators or stoplights. For elevator control, the apparatus is arranged to focus an image of the interior of the elevator onto the photosensor array. The reference signal corresponds to the output of the array when a predetermined number of persons are present in the elevator. As the elevator is filled up with people, the output of the array progressively becomes more similar to the reference signal. When the predetermined number of people enter the elevator and the predetermined degree of correspondence is attained, the elevator doors are automatically closed and the elevator sent up or down as desired.

The apparatus may be placed at a pedestrian crossing an essentially similar manner to control a stoplight to stop traffic when a predetermined number of people have gathered, waiting to cross the street.

In summary, it will be seen that the present invention provides an optoelectronic sensing apparatus which is more accurate and reliable than prior art apparatus of comparable type. Various modifications will become possible for those skilled in the art after receiving the teachings of the present disclosure. For example, the adder 46 and buffer register 47 may be omitted, and the comparator 49 adapted to sense the minimum value of the digital difference signals appearing at the output of the converter 43. In this case, the distance would be determined as corresponding to the minimum difference between the outputs of any of the respective photosensor elements of the arrays 16 and 18.

What is claimed is:

1. An optoelectronic sensing apparatus comprising:
a photosensor array including a plurality of photosensor elements for producing respective electrical signals having magnitudes corresponding to incident light intensity;

optical converging means for focussing a progressively changing light image onto the photosensor array;

reference signal means for producing a plurality of electrical reference signals equal in number to the signals;

strobe means for sequentially strobing the photosensor elements a predetermined number of times, each photosensor element producing the respective electrical signal when strobed;

subtractor means for comparing respective electrical signals and reference signals and producing electrical difference signals corresponding to differences therebetween;

minimum value sensor means for sensing a minimum absolute value of the difference signals; and counter means for progressively counting a number of times the photosensor elements are sequentially strobed by the strobe means and producing an electrical count signal having a magnitude corresponding to a count of the counter means at which the minimum value of the difference signals is sensed by the sensor means.

2. An apparatus as in claim 1, in which the sensor means comprises an analog-to-digital converter for converting the difference signals into digital signals, minimum value storage means and comparator means for sequentially comparing the digital signals with a minimum value signal in the minimum value storage means, the comparator means controlling the minimum value storage means to replace the minimum value signal with a digital signal when a value of the digital signal is lower than a value of the minimum value signal.

3. An apparatus as in claim 1, in which the sensor means comprises an analog-to-digital converter for converting the difference signals into digital signals, summation means for summing, each time all of the photosensor elements are sequentially strobed, the respective digital signals to produce a summation signal, minimum value storage means and comparator means for comparing the summation signals with a minimum value signal in the minimum value storage means, the comparator means controlling the minimum value storage means to replace the minimum value signal with a summation signal when a value of the summation signal is lower than a value of the minimum value signal.

4. An apparatus as in claim 1, in which the counter means produces the count signal in digital form, the apparatus further comprising a digital-to-analog converter for converting the count signal into an analog signal, a movable mechanical member, position signal generator means for generating an electrical position signal having a magnitude corresponding to a position of the mechanical member, comparator means for comparing the position signal with the analog signal and producing an electrical error signal corresponding to a difference therebetween and drive means for driving the mechanical member to a position at which the error signal is zero.

5. An apparatus as in claim 4, in which the mechanical member is a camera lens.

6. An apparatus as in claim 1, in which the counter means is incremented each time the strobe means strobes all of the photosensor elements and is reset when the sensor means senses the minimum value of the difference signals.

7. An apparatus as in claim 1, in which the reference signal means comprises a reference photosensor array identical to the photosensor array and a reference optical converging means disposed parallel to the optical converging means for focussing a first light image of an object onto the reference photosensor array, the apparatus further comprising a rotatable mirror for reflecting a second light image constituting the changing light image from the optical converging means onto the photosensor array and drive means for rotating the rotatable mirror, the sensor means sensing the minimum value of the difference signals when the second light image incident on the photosensor array is substantially identical to the first light image incident on the reference photosensor array.

8. An apparatus as in claim 1, further comprising indicator means energized by the sensor means upon sensing of the minimum value thereby.

9. An apparatus as in claim 1, in which the subtractor means comprises a differential amplifier.

10. An apparatus as in claim 9, in which the sensor means comprises an absolute value circuit for producing analog absolute value signals from the respective difference signals and a sample-and-hold circuit for temporarily latching the absolute value signals.

* * * * *